(12) United States Patent
Houle et al.

(10) Patent No.: US 6,819,016 B2
(45) Date of Patent: Nov. 16, 2004

(54) LIQUID COOLING ARRANGEMENT FOR ELECTRIC MACHINES

(75) Inventors: Martin Houle, Laval (CA); André Langlois, Beloeil (CA)

(73) Assignee: TM4 Inc., Quebec (CA)

(*) Notice: Subject to any disclaimer, the term of this patent is extended or adjusted under 35 U.S.C. 154(b) by 71 days.

(21) Appl. No.: 10/198,186

(22) Filed: Jul. 18, 2002

(65) Prior Publication Data

US 2004/0012272 A1 Jan. 22, 2004

(51) Int. Cl.[7] ................................................. H02K 9/00

(52) U.S. Cl. ........................................... 310/52; 310/61

(58) Field of Search .......................... 310/52–59, 60 R, 310/60 A, 61–64

(56) References Cited

U.S. PATENT DOCUMENTS

| | | |
|---|---|---|
| 3,562,568 A | 2/1971 | Susdorf et al. |
| 3,609,420 A | 9/1971 | Inagaki et al. |
| 3,778,647 A | 12/1973 | Leistner |
| 3,906,265 A | 9/1975 | Giles |
| 3,995,181 A | 11/1976 | Suit |
| 4,083,917 A | 4/1978 | Hallerback et al. |
| 4,221,982 A | 9/1980 | Raver et al. |
| 4,329,603 A | 5/1982 | Ballard |
| 4,498,024 A | 2/1985 | Moretti et al. |
| 4,514,652 A | 4/1985 | Olson |
| 4,516,044 A | 5/1985 | Bone |
| 4,728,840 A | 3/1988 | Newhouse |
| 4,786,834 A | 11/1988 | Grant et al. |
| 4,797,588 A | 1/1989 | Capion |
| 4,864,176 A | 9/1989 | Miller et al. |
| 4,955,944 A | 9/1990 | Aso et al. |
| 5,091,666 A | 2/1992 | Jarczynski |
| 5,223,757 A | 6/1993 | Staub et al. |
| 5,250,863 A | 10/1993 | Brandt |
| 5,293,089 A | 3/1994 | Frister |
| 5,331,238 A | 7/1994 | Johnsen |
| 5,347,188 A | 9/1994 | Iseman et al. |
| 5,363,002 A | 11/1994 | Hernden et al. |
| 5,365,132 A | 11/1994 | Hann et al. |
| 5,408,152 A | 4/1995 | Finnerty et al. |
| 5,448,118 A | 9/1995 | Nakamura et al. |
| 5,473,207 A * | 12/1995 | Hopeck et al. ............... 310/65 |
| 5,519,269 A | 5/1996 | Lindberg |
| 5,585,681 A | 12/1996 | Bitsche |
| 5,698,925 A | 12/1997 | Coupart |
| 5,731,643 A | 3/1998 | Avakian et al. |
| 5,808,387 A * | 9/1998 | Akachi et al. ............... 310/54 |
| 5,852,865 A | 12/1998 | Kirtley, Jr. et al. |
| 5,859,482 A * | 1/1999 | Crowell et al. ............... 310/58 |
| 5,866,959 A | 2/1999 | Le Flem |
| 6,040,645 A | 3/2000 | Lynch |
| 6,069,424 A | 5/2000 | Colello et al. |
| 6,072,253 A * | 6/2000 | Harpenau et al. ............ 310/58 |
| 6,111,334 A | 8/2000 | Horski et al. |
| 6,114,784 A | 9/2000 | Nakano |
| 6,633,097 B2 * | 10/2003 | Dunlap et al. ............... 310/54 |

FOREIGN PATENT DOCUMENTS

| | | |
|---|---|---|
| EP | 225132 A1 | 6/1987 |
| EP | 503093 A1 | 9/1992 |
| EP | 589187 A1 | 3/1994 |
| EP | 893871 A2 | 1/1999 |
| EP | 967707 A2 | 12/1999 |

(List continued on next page.)

*Primary Examiner*—Thanh Lam
(74) *Attorney, Agent, or Firm*—Meyertons, Hood, Kivlin, Kowert & Goetzel, P.C.; Eric B. Meyertons (57) ABSTRACT

A cooling arrangement for electric machines comprising a heat storing element provided with generally C-shaped channels and a cooling tube so configured and sized as to be insertable in said C-shaped channels of said heat storing element is described herein. The cooling tube, once inserted in the channels is deformed to conform to the C-shaped channels, whereby heat stored in said heat storing element is extracted by circulating cooling fluid inside the cooling tube.

12 Claims, 10 Drawing Sheets

FOREIGN PATENT DOCUMENTS

| | | |
|---|---|---|
| EP | 1041699 A2 | 10/2000 |
| WO | 89/00358 | 1/1989 |
| WO | 95/34936 | 12/1995 |
| WO | 96/00462 | 1/1996 |
| WO | 97/44882 | 11/1997 |
| WO | 00/54394 | 9/2000 |
| WO | 01/13496 | 2/2001 |
| WO | 01/33698 | 5/2001 |

* cited by examiner

FIG_2

LIQUID COOLING ARRANGEMENT FOR ELECTRIC MACHINES

FIELD OF THE INVENTION

The present invention relates to electric machines. More specifically, the present invention is concerned with a liquid cooling arrangement for electric machines.

BACKGROUND OF THE INVENTION

Electric machines, whether they be motors or generators, are well known in the art. It is also widely known that electric machines generate heat as a by-product and that this heat must be somehow extracted from the machine to improve the performances of the machine and prevent early degradation of the machine.

Conventionally, electric machines are often air-cooled. This is easily done by providing apertures in the body of the machine to let air be forced therein. The efficiency of such a cooling arrangement is poor since air is a generally non-efficient cooling fluid. Furthermore, some electric machine operate in environment that are such that it is not possible to provide an electric machine with apertures.

Electric machines using cooling fluid have also been designed. For example, European Patent Number 0,503,093 entitled "Liquid Cooling Device of Motor" and naming Nakamura as inventor discloses an electric motor where the laminations are provided with apertures allowing an axial flow of cooling liquid when the laminations are assembled. A drawback of Nakamura's system is the risk of failure of the motor caused by leaks. Indeed, a failure-causing link could spring should the seal between adjacent laminations fail.

OBJECTS OF THE INVENTION

An object of the present invention is therefore to provide an improved liquid cooling arrangement for electric machines.

SUMMARY OF THE INVENTION

More specifically, in accordance with the present invention, there is provided A cooling arrangement for electric machines comprising:
  a heat storing element provided with generally C-shaped channels;
  a cooling tube so configured and sized as to be insertable in said C-shaped channels of said heat storing element;
  wherein a) said cooling tube, once inserted in said channels is deformed to conform to the C-shaped channels; and b) heat stored in said heat storing element is extractable by said cooling tube.

According to another aspect of the present invention, there is provided a An electric machine comprising:
  a generally hollow cylindrical stator;
  a rotor rotatably mounted to said stator;
  a cooling arrangement including:
    a heat storing element provided with generally C-shaped channels; said heat storing element being associated with said stator to extract heat therefrom;
    a cooling tube so configured and sized as to be insertable in said C-shaped channels of said heat storing element;
    wherein a) said cooling tube, once inserted in said channels is deformed to conform to the C-shaped channels; and b) heat stored in said heat storing element is extractable by said cooling tube.

It is to be noted that the expression "electric machine" is to be construed herein as encompassing both electric motors and electric generators disregarding the technology used in these machines.

Other objects, advantages and features of the present invention will become more apparent upon reading of the following non-restrictive description of preferred embodiments thereof, given by way of example only with reference to the accompanying drawings.

DESCRIPTION OF THE EMBODIMENTS

In a nutshell, a first embodiment of the present invention, illustrated in FIGS. 1 to 5b, uses the laminations of the stator as a heat storing element provided with generally C-shaped channels in which a cooling tube is mounted. In operation, cooling fluid is circulated in the cooling tube to extract heat stored in the laminations.

A second embodiment of the present invention, illustrated in FIGS. 6 to 9, uses a separate heat storing element also provided with generally C-shaped channels in which a cooling tube is mounted. The heat storing element is then inserted in the stator of an electric machine with the cooling tube in contact with both the heat storing element and the stator. In operation, cooling fluid is circulated in the cooling tube to extract heat accumulated in the heat storing element and in the stator.

Turning now to FIGS. 1 to 5b a cooling arrangement 10 according to the first embodiment of the present invention will now be described.

Figure 1:
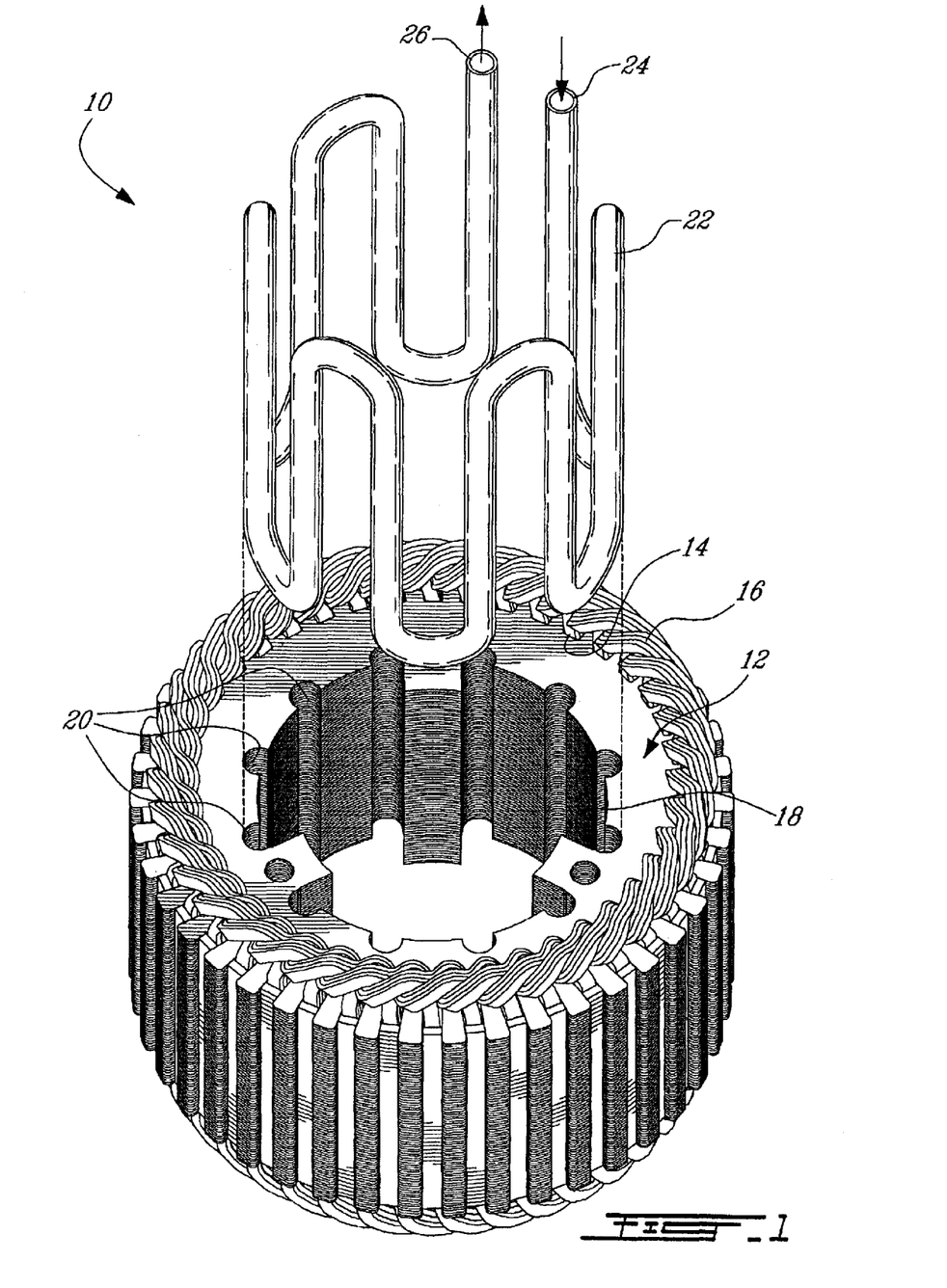
FIG. 1 is a perspective, partly exploded view, of the stator of an electric machine provided with a cooling arrangement according to a first embodiment of the present invention.

FIG. 1 shows a stator 12 of an electric machine (not shown). The stator 12 is made of a plurality of identical laminations stacked together. The stator 12 is generally cylindrical and includes rectangular external channels 14 in which coils 16 are mounted. It is to be noted that the stator 12 is a so-called internal stator, i.e. that the rotor (not shown) is so mounted to the stator as to be coaxial and external to the stator 12.

The laminations of the stator 12 are used as a heat storing element, as will be described hereinbelow.

The inside surface 18 of the stator 12 is provided with a plurality of generally C-shaped channels 20.

The cooling arrangement 10 also includes a cooling tube 22 having a generally circular cross-section and provided with an inlet 24 and an outlet 26. As can be clearly seen in FIG. 1, the cooling tube 22 is so folded as to form a serpentine.

As will be explained hereinbelow, the cooling tube is so configured and sized to be inserted in the C-shaped channels 20 of the stator 12.

Figure 2:
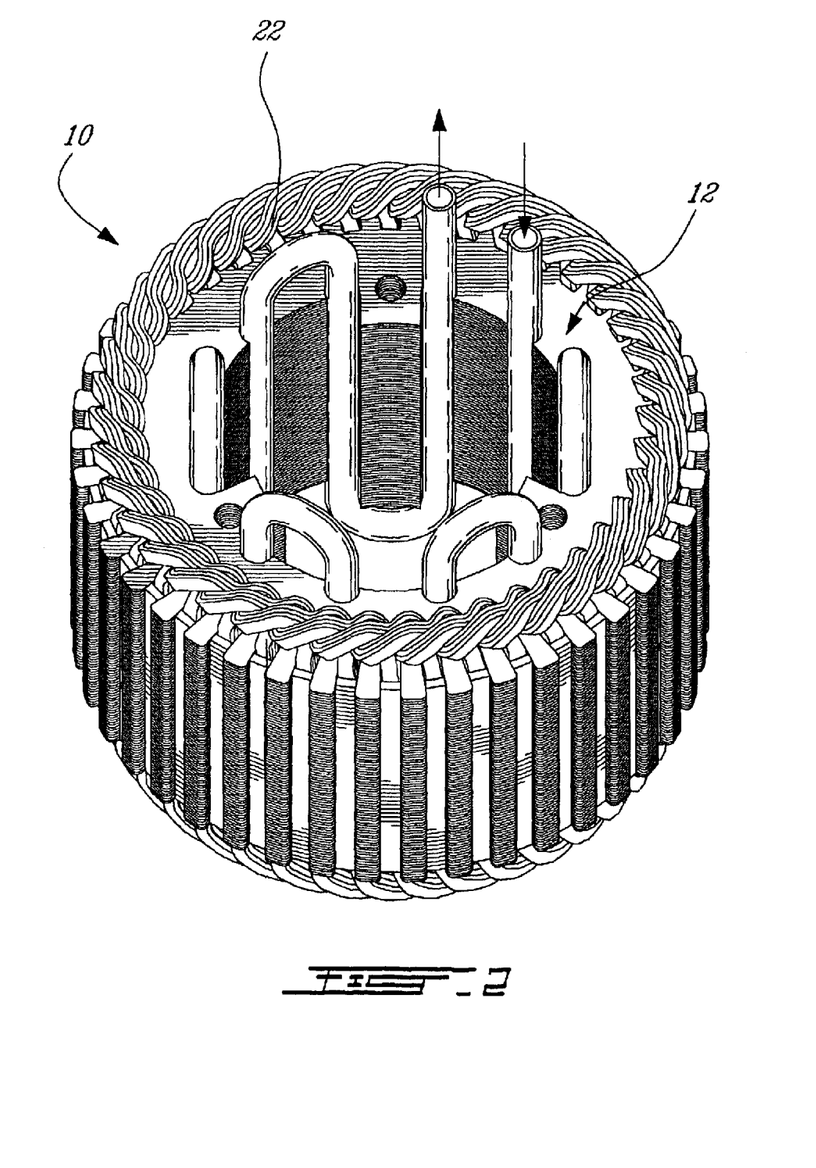
FIG. 2 is a perspective view of the stator of FIG. 1 where the cooling tube is inserted in channels provided therein.
Figure 3:
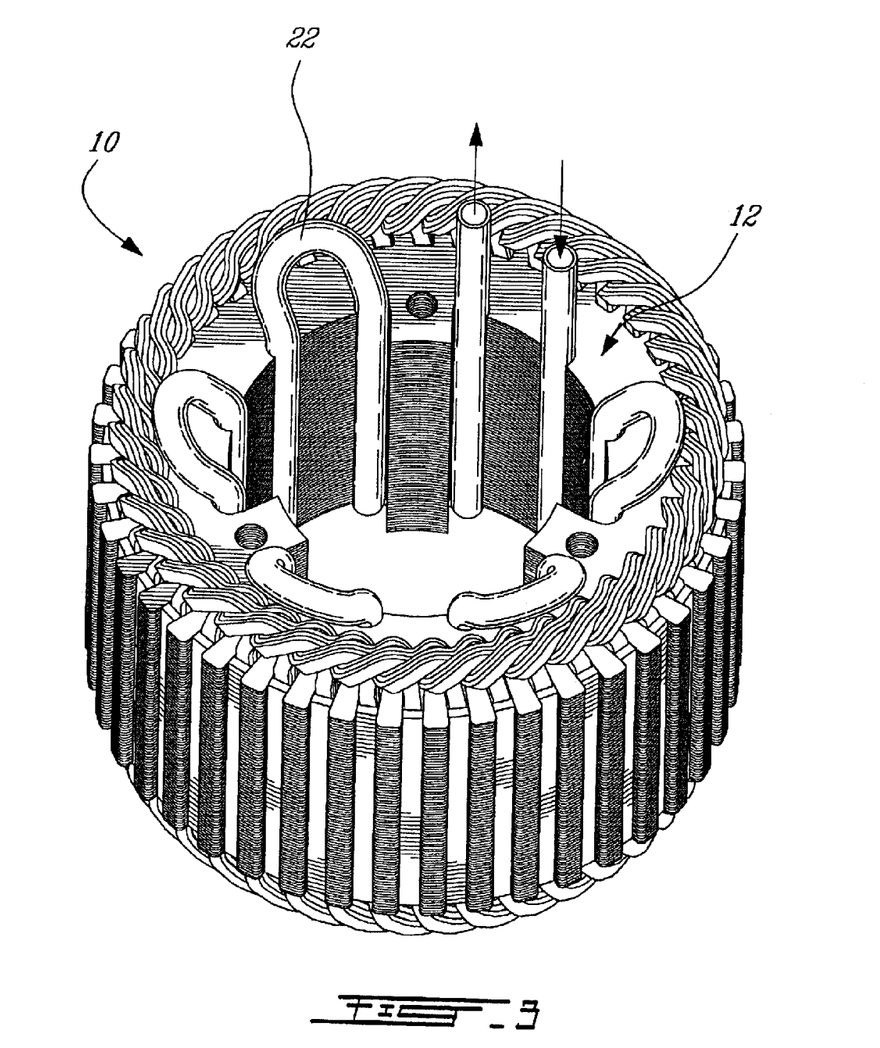
FIG. 3 is a perspective view illustrating the completed stator of FIG. 1.

FIG. 2 illustrates the cooling tube 22 inserted in the generally C-shaped channels of the stator 12. As can be seen in this Figure, the serpentine folding of the cooling tube 22 is optionally configured so that the rounded portions thereof extend outside of the stator 12. This arrangement may be interesting since is allows the rounded portions of the cooling tube to be folded outwardly as illustrated in FIG. 3 to increase the contact surface between the cooling tube 22 and the stator 12.

Figure 4:
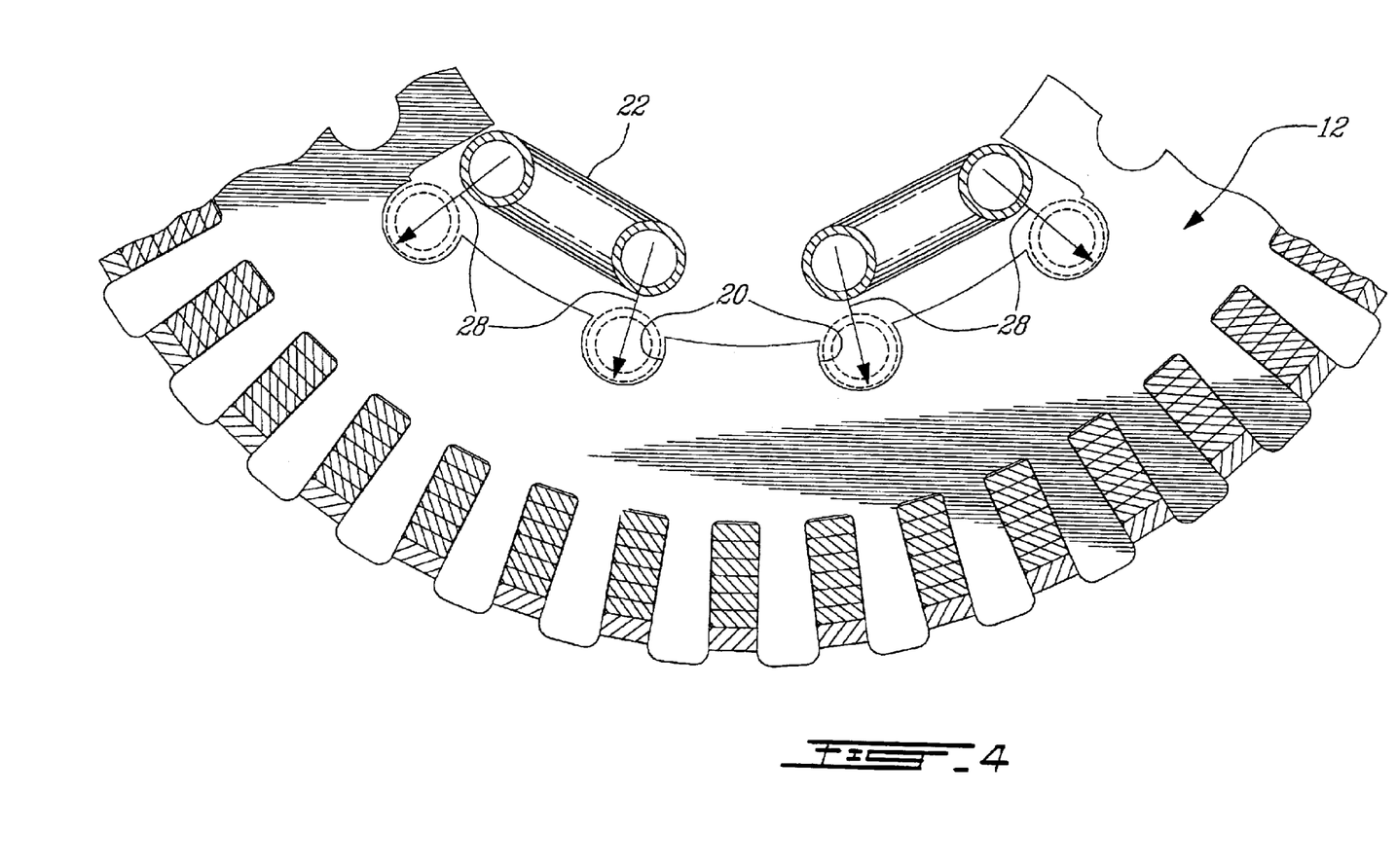
FIG. 4 is a sectional view illustrating the insertion of sections of the cooling tube in the channels provided in the stator.
Figure 5A:
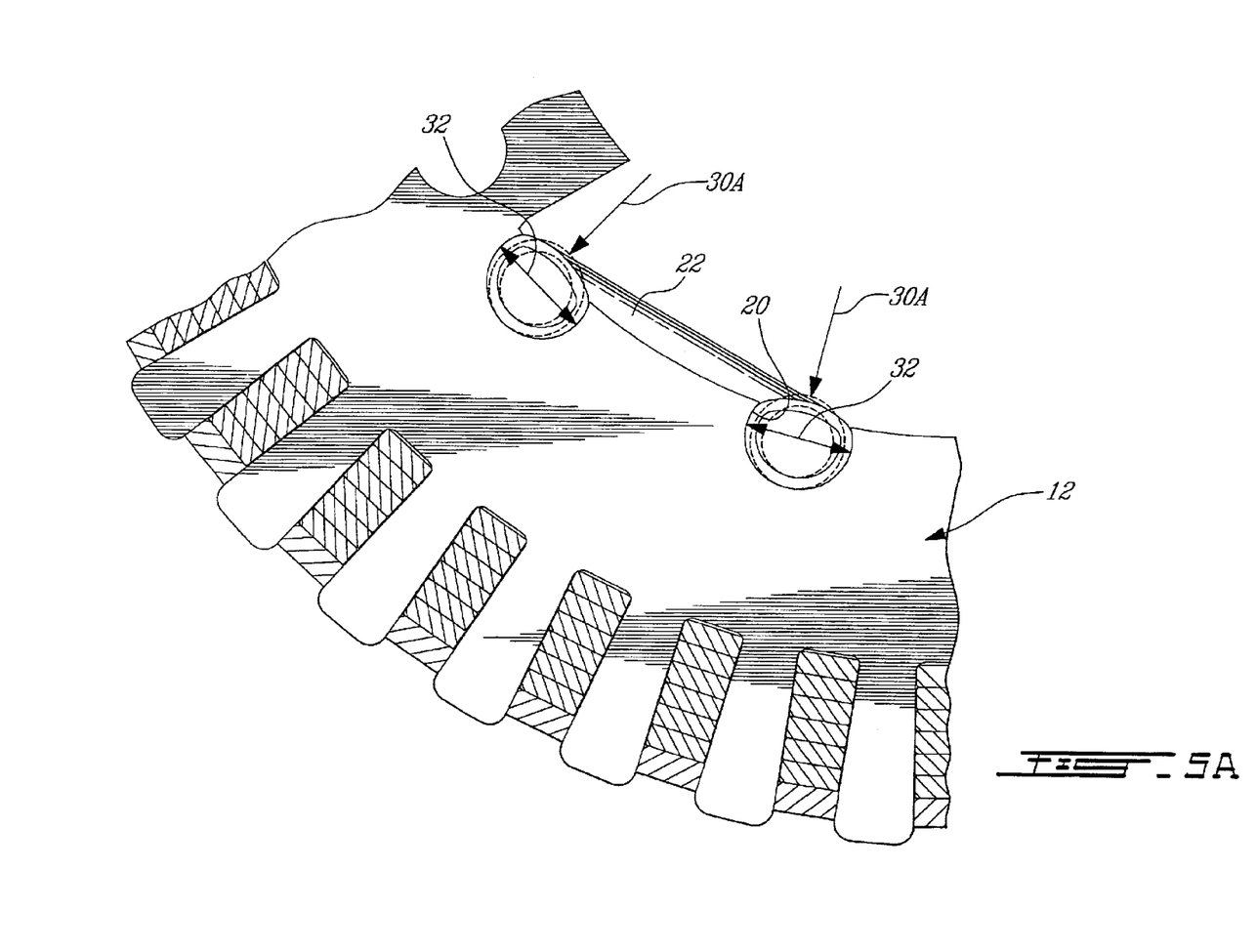
FIG. 5a is a sectional view illustrating the cooling tubes inserted in the channels and deformed according to a first pattern to permanently mount them in the channels.

Turning now to FIGS. 4 and 5a, it can be better seen that each C-shaped channel 20 has a generally closed C-shape configuration, i.e. that the opening of the channel is smaller than the widest portion of the channel. It is also to be noted that the circular cross section of the cooling tube 22 is at most equals to the opening of the channel to allow its insertion therein.

To insert the cooling tube 22 in the channels 20, a first step is to generally align the straight portions of the cooling tube 22 with a corresponding channel 20 of the stator 12, as can be seen in FIG. 4. This operations is facilitated by the possibility to significantly deform the serpentine configuration of the tube 22 to allow its insertion into the central opening of the stator 12.

The next insertion step is to deform the serpentine configuration of the cooling tube 22 so that each straight section is inserted in a corresponding channel (see arrows 28 in FIG. 4). The result of this step is illustrated in dashed lines in FIG. 4.

To maintain the straight portions of the cooling tube 22 into the channels 20, these straight portions are deformed to conform to the generally closed C-shaped configuration of the channels 20. To achieve this, a pressure is radially applied (see arrows 30a in FIG. 5a) onto the cooling tube 22. This radial pressure causes the widening of the tube as can be seen from arrows 32. It is to be noted that according to this first type of deformation of the cooing tube 22, the cooling tube 22, once deformed, presents a slightly convex surface with respect to the inner surface of the stator 12.

It is to be noted that, optionally, a heat conducting and/or adhesive substance may be placed between the channel and the tube to provide improved heat transfer between these elements.

It is also to be noted that while many materials can be used for the cooling tube 22, good results have been obtained by using copper tubing.

Figure 5B:
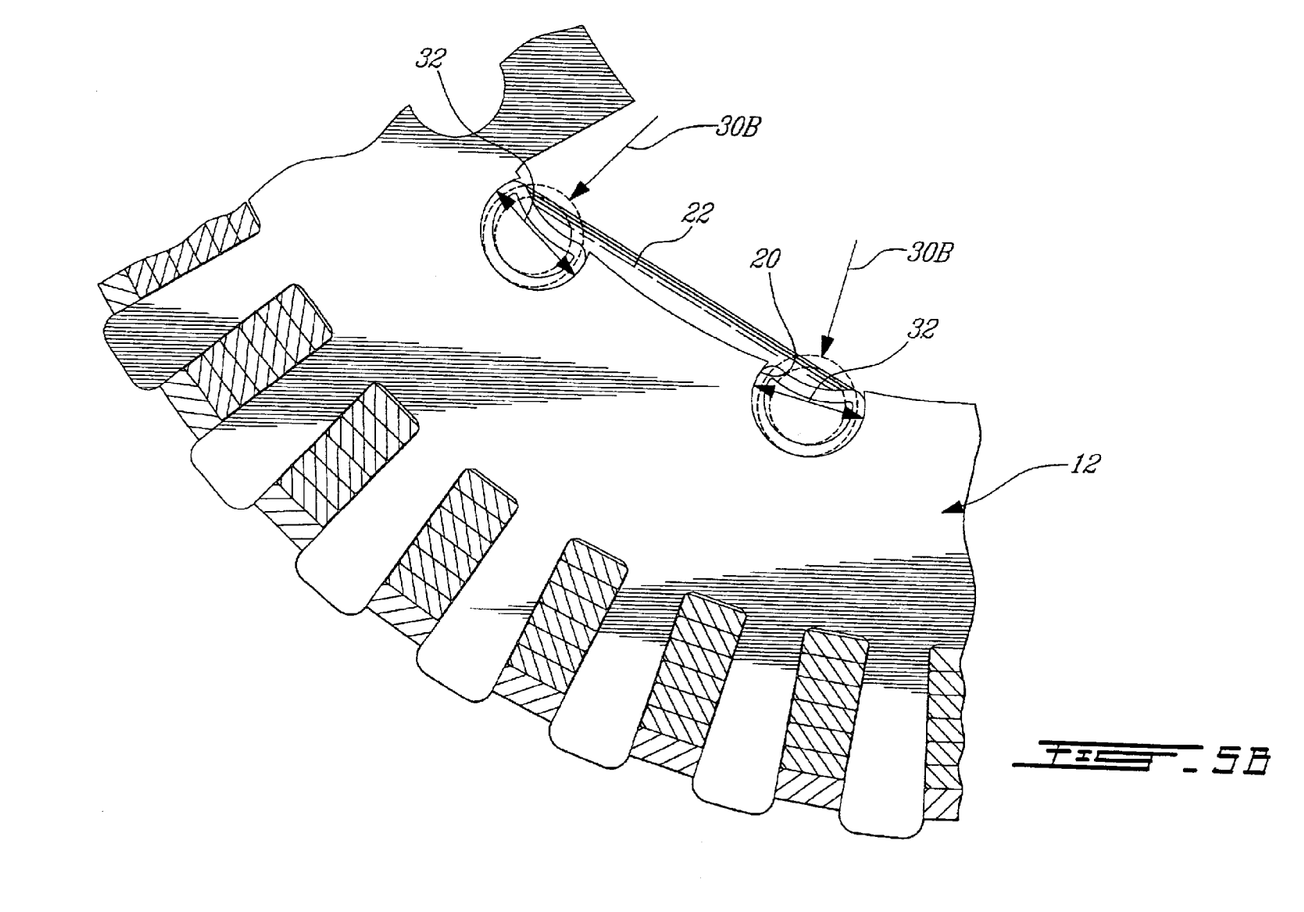
FIG. 5b is a sectional view illustrating the cooling tubes inserted in the channels and deformed according to a second pattern to permanently mount them in the channels.

Turning now briefly to FIG. 5b of the appended drawings a second type of deformation of the cooling tube 22 inside the channels 20 will be briefly described. As can be seen from this figure, the second type of deformation of the cooing tube 22 presents a slightly concave surface with respect to the inner surface of the stator 12. Again, to achieve this, a pressure is radially applied (see arrows 30b in FIG. 5b) onto the cooling tube 22.

This second type of deformation is believed interesting since, it would prevent unwanted loosening of the cooling tube inside the channels.

Turning now to FIGS. 6 to 9, a cooling arrangement 100 according to a second embodiment of the present invention will now be described.

Figure 6:
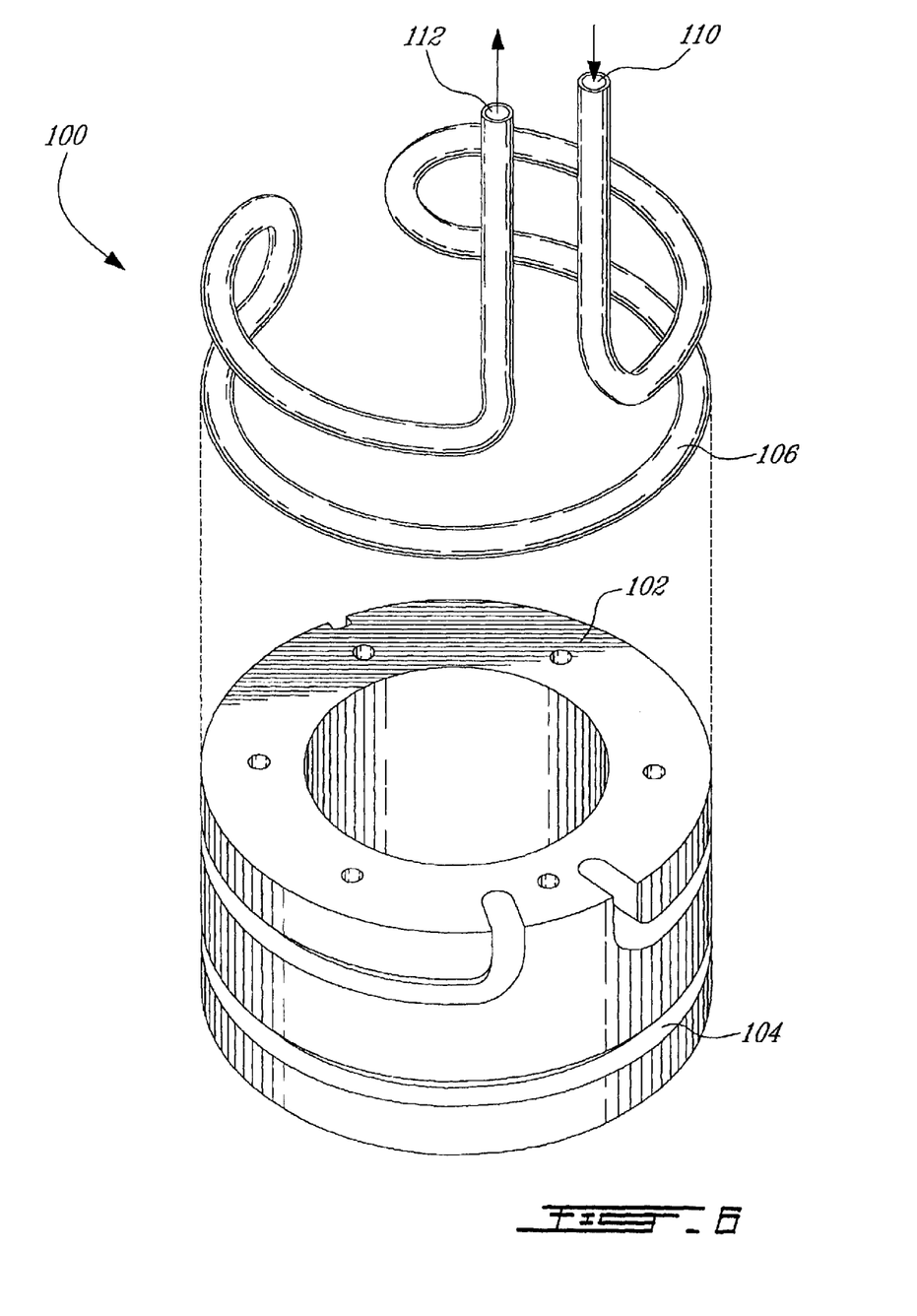
FIG. 6 is an exploded view of a cooling arrangement according to a second embodiment of the present invention.

As mentioned hereinabove, the cooling arrangement 100 uses a separate heat storing element 102. This heat storing element 102 includes an external and generally circumferential channel 104 into which a cooling tube 106 having a serpentine configuration may be inserted as will be described hereinbelow. It is to be noted that while it is not expressly illustrated in the appended figures, the channel 104 has a serpentine configuration generally corresponding to the serpentine configuration of the cooling tube 106.

The cooling tube 106 has a generally serpentine configuration and includes an inlet 110 and an outlet 112.

Figure 7:
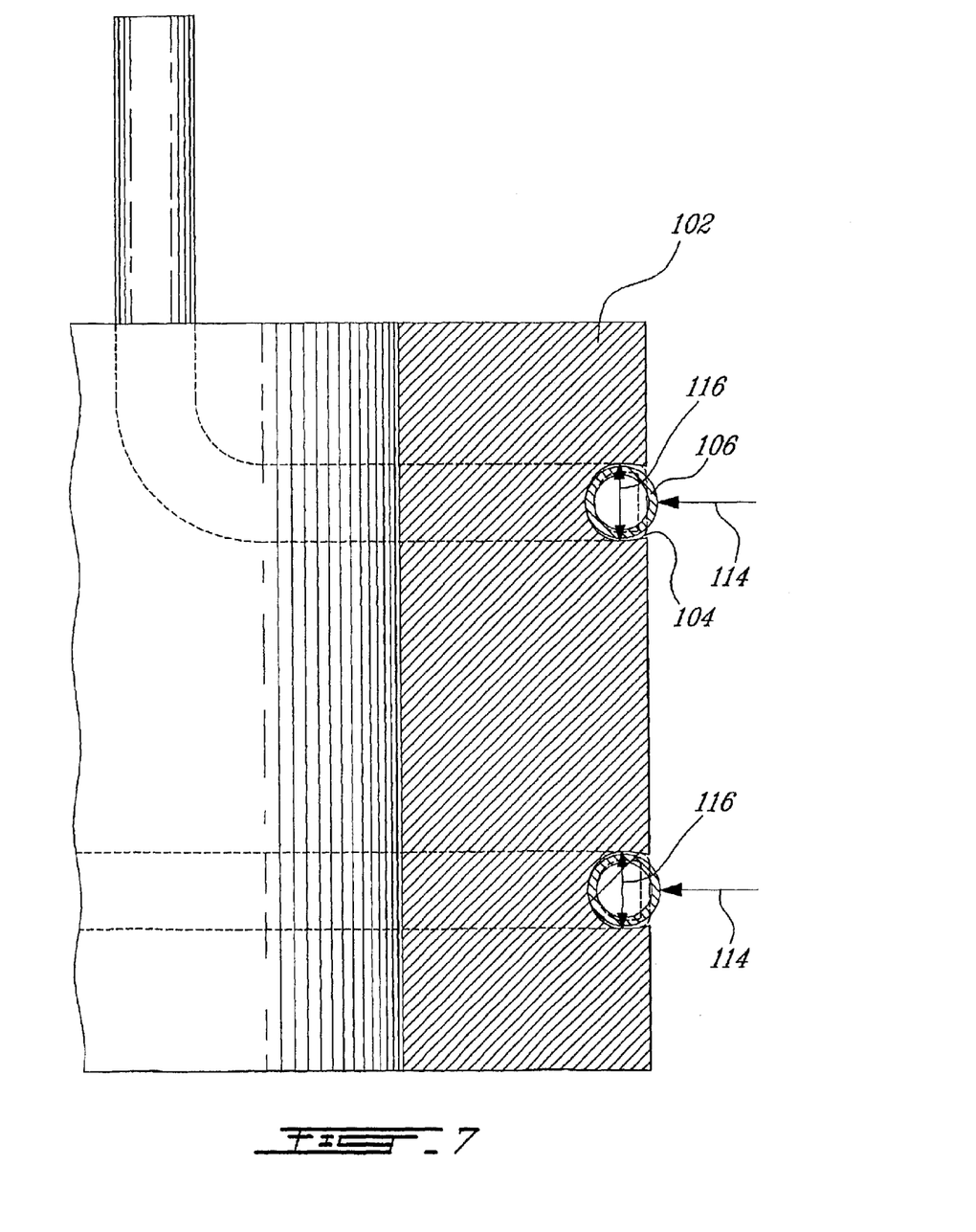
FIG. 7 is a side elevational view of the cooling arrangement of FIG. 6 illustrating the deformation of the cooling tube in the channels of the heat storing element.
Figure 9:
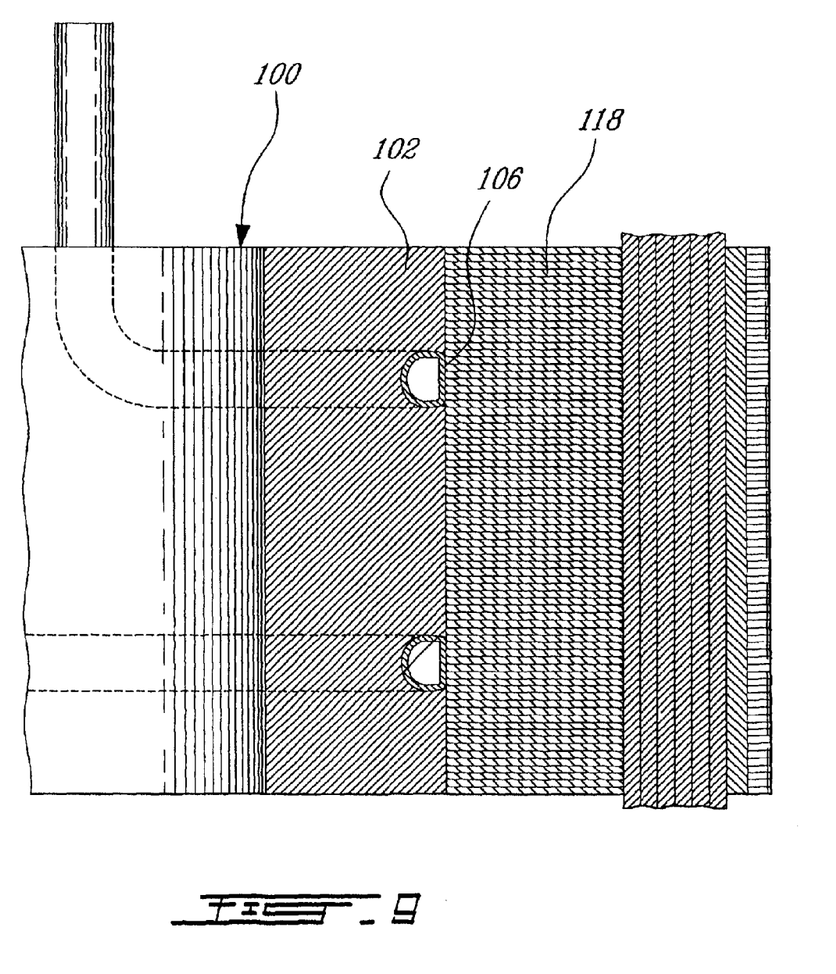
FIG. 9 is a side elevational view of the assembled stator including the cooling arrangement of FIG. 6.

As can be better seen from FIGS. 7 and 9, the C-shaped channel 104 has a generally open C-shape configuration, i.e. that the opening of the channel is the same width as the widest portion of the channel.

Again, the insertion of the cooling tube 106 into the channel 106 is generally straightforward. The cooling tube 106 is first positioned so that is adequately faces the channel 104. The tube is then inserted in the channel (see the tube 106 in full lines in FIG. 7). The final step is to deform the cooling tube so that it does not protrudes from the external surface of the heat storing element 102 (see the tube 106 in dashed lines in FIG. 7). This is done by applying an inwardly radial pressure (see arrows 114), which forces the tube 106 to conform to the channel 104 (see arrows 116).

As mentioned hereinabove, a heat conducting and/or adhesive substance may optionally be placed between the channel and the tube to provide improved heat transfer between these elements.

Figure 8:
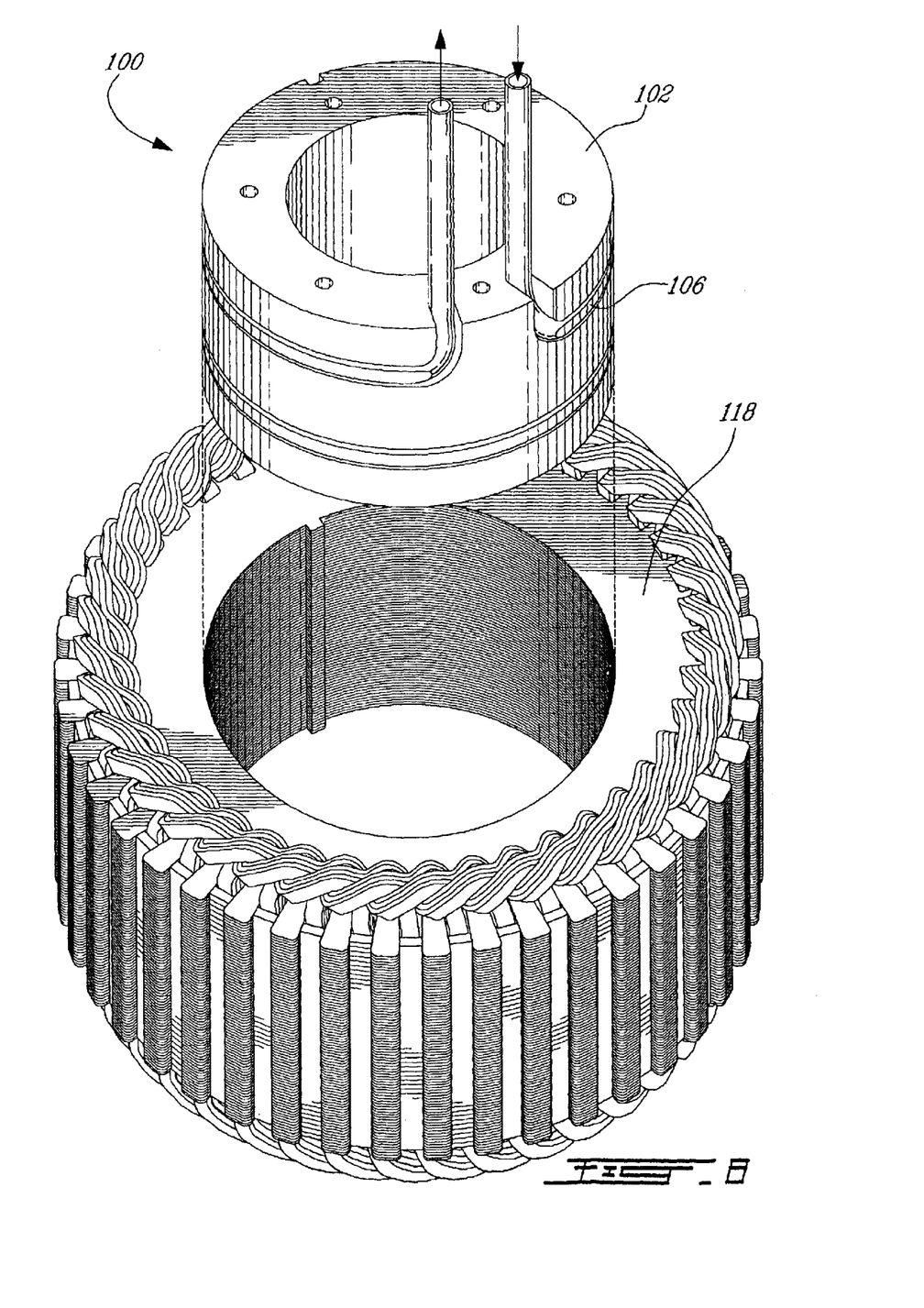
FIG. 8 is a perspective, partly exploded view, of the cooling arrangement of FIG. 6 and the stator of an electric machine.

Turning now briefly to FIG. 8 of the appended drawings, once the cooling tube 106 is properly inserted in the heat storing element 102, the cooling arrangement 100 may be inserted in the stator 118 of an electric machine (not shown).

FIG. 9 is a sectional view of the cooling arrangement 100 mounted in the stator 118. One skilled in the art will appreciate that since the cooling tube 106 contacts both the heat storing element 102 and the stator 118, heat from these two elements will be extracted by the cooling fluid circulating in the cooling tube 106.

It is to be noted that even though the two embodiments of the present invention have been illustrated as being part of an electric machine provided with an internal stator and an external rotor (not shown), one skilled in the art could easily adapt the present invention to be used in an electric machine having an external stator and an internal rotor.

It is also to be noted that while the embodiments of the present invention have been described hereinabove as using an open cooling tube where a flow of fluid is used to extract the heat from the heat storing element, other cooling technologies, such as, for example, the heat pipe technology could be used. Indeed, one skilled in the art would have no problem designing or modifying conventionally known heat pipes so that they can be mounted in the C-shaped channels. For example, in the first embodiment illustrated in FIGS. 1–5b, separate straight heat pipes (not shown) could be inserted in each longitudinal channel 20, and in the second embodiment illustrated in FIGS. 6–9, a continuous heat pipes (not shown) could be inserted in the channel 114.

It is also to be noted that the two embodiments illustrated respectively in FIGS. 1 to 5b and 6 to 9 could be combined to increase the cooling possibilities.

Although the present invention has been described hereinabove by way of preferred embodiments thereof, it can be modified, without departing from the spirit and nature of the subject invention as defined in the appended claims.

What is claimed is:

1. A cooling arrangement for electric machines comprising:
    a heat storing element provided with channels having a C-shaped cross-section;
    a cooling tube so configured and sized as to be insertable in said channels of said heat storing element;
    wherein a) said cooling tube, once inserted in said channels is deformed to conform to the channels; and b) heat stored in said heat storing element is extractable by said cooling tube.

2. A cooling arrangement as recited in claim 1, wherein extraction of the heat stored in said heat storing element is done via a circulation of cooling fluid in said cooling tube.

3. A cooling arrangement as recited in claim 1, wherein said cooling tube has a generally circular cross-section.

4. A cooling arrangement as recited in claim 1, wherein said cooling tube is so folded as to form a serpentine.

5. A cooling arrangement as recited in claim 1, wherein said heat storing element is made of a heat storing material and has a generally hollow cylindrical configuration having an external diameter slightly smaller that an inner diameter of a hollow cylindrical stator of the electric machines.

6. A cooling arrangement as recited in claim 5, wherein said heat storing material contains aluminium.

7. A cooling arrangement as recited in claim 5, wherein said channels are provided on said an external surface of said heat storing material.

8. A cooling arrangement as recited in claim 7, wherein said channels have an open C-shaped configuration.

9. A cooling arrangement as recited in claim 7, wherein said channels and said cooling tubes are so dimensioned that when said cooling tube is inserted in said channels and deformed, said cooling tube is generally flush with the an inner surface of the stator; whereby, when said heat storing element is inserted in the stator of the electric machine, the cooling tube is in contact with both the heat storing element and the inner surface of the stator of the electric machine.

10. An electric machine comprising:
    a generally hollow cylindrical stator;
    a rotor rotatably mounted to said stator;
    a cooling arrangement including:
        a heat storing element provided with channels having C-shaped cross-section; said heat storing element being associated with said stator to extract heat therefrom;
        a cooling tube so configured and sized as to be insertable in said channels of said heat storing element;
        wherein a) said cooling tube, once inserted in said channels is deformed to conform to the channels; and b) heat stored in said heat storing element is extractable by said cooling tube.

11. An electric machine as recited in claim 10, wherein said extraction of the heat stored in said heat storing element is done via a circulation of cooling fluid in said cooling tube.

12. An electric machine as recited in claim 10, wherein said heat storing element is made of a heat storing material and has a generally cylindrical configuration having an external diameter slightly smaller that an inner diameter of said hollow cylindrical stator.

* * * * *

UNITED STATES PATENT AND TRADEMARK OFFICE
CERTIFICATE OF CORRECTION

PATENT NO. : 6,819,016 B2  
APPLICATION NO. : 10/198186  
DATED : November 16, 2004  
INVENTOR(S) : Houle et al.

Page 1 of 1

It is certified that error appears in the above-identified patent and that said Letters Patent is hereby corrected as shown below:

In the Claims:

Claim 7, col. 6, line 2, please delete "on said an" and substitute therefor -- "on an" --.

Claim 9, col. 6, line 9, please delete "with the an" and substitute therefor -- "with an" --.

Claim 11, col. 6, line 28, please delete "said extraction" and substitute therefor -- "extraction" --.

Claim 12, col. 6, line 33, please delete "smaller that" and substitute therefor -- "smaller than" --.

Signed and Sealed this

Eighth Day of January, 2008

JON W. DUDAS  
*Director of the United States Patent and Trademark Office*